United States Patent Office 2,722,521
Patented Nov. 1, 1955

2,722,521
RESINS AND PRODUCTION THEREOF

Alfred W. Shaw, La Grange, and Carl B. Linn, Riverside, Ill., assignors to Universal Oil Products Company, Chicago, Ill., a corporation of Delaware No Drawing. Application November 2, 1951,
Serial No. 254,657

13 Claims. (Cl. 260—17.2)

This invention relates to resins and also to a process for producing these materials.

Modified alkyd resins are important and useful, particularly for producing surface coating materials and for molding or casting into various articles. These resins are also useful for coating of paper, textiles, fabrics, porous materials, and the like.

An object of this invention is a novel alkyd type resin.

Another object of this invention is the production of a modified alkyd resin useful as a surface coating material.

One embodiment of this invention relates to a process for producing a resin which comprises reacting a member of the group consisting of a polybasic organic acid and an anhydride of a polybasic organic acid with an aromatic polyhydric alcohol produced by condensing a carbohydrate with an aromatic compound in the presence of an acid-acting catalyst.

Another embodiment of this invention relates to a process for producing a resin which comprises reacting a member of the group consisting of a polybasic organic acid and an anhydride of a polybasic organic acid with an aromatic polyhydric alcohol produced by condensing a carbohydrate with an aromatic compound in the presence of a strong hydrofluoric acid catalyst.

The process of this invention is carried out preferably by reacting the anhydride of a polybasic organic acid with an aromatic polyhydric alcohol of the nature as disclosed herein, at a temperature of from about 150° to about 300° C., and preferably at a temperature of from about 200° to about 250° C. and sometimes in the presence of an organic solvent, such as an alkylketone, an alkyl ether, a monocyclic aromatic hydrocarbon, such as benzene, toluene, etc., a paraffinic hydrocarbon, such as hexane, heptane, or a substantially paraffinic naphtha fraction as well as terpenic hydrocarbons including terpentine, and chlorine containing solvents, such as ethylene dichloride, carbon tetrachloride, di-chloroethyl ether, etc.

The aromatic polyhydric alcohols which are used as starting materials in this process are obtained by reacting a carbohydrate with an aromatic compound, and particularly with an aromatic hydrocarbon or a phenol in the presence of a concentrated hydrofluoric acid catalyst, particularly a catalyst containing at least 90% by weight of hydrogen fluoride or in the presence of another acid-acting catalyst whereby a condensation product is formed containing one or more aromatic molecules combined with a simple carbohydrate group, such as pentose or hexose group. The condensation of a carbohydrate, such as cellulose, a pentose, a hexose or a di-saccharide, such as sucrose, with an aromatic compound is carried out preferably at a temperature of from about —40° to about 100° C. and at a pressure sufficient to keep the reactants and hydrofluoric acid catalyst in substantially liquid phase.

Aromatic compounds which are used in producing the aromatic polyhydric alcohols include aromatic hydrocarbons, hydroxy aromatic compounds as phenols, aromatic carboxylic acids, such as benzoic acid, toluic acid, etc. The aromatic hydrocarbons include benzene, toluene, the xylenes, ethylbenzene, and other alkylated benzenes of higher molecular weight having at least 1 replaceable hydrogen atom joined to a carbon atom of the aromatic nucleus. Hydroxy aromatic compounds which are condensed with carbohydrates have at least 1 hydroxyl group bound directly to the aromatic ring and have at least 1 readily replaceable hydrogen atom joined to the aromatic ring. Such hydroxy aromatic compounds include particularly the phenols and naphthols as well as hydroxy aromatic acids such as salicylic acid. The phenols may be referred to broadly as organic compounds having at least 1 hydroxy group attached directly to a benzene ring while the naphthols similarly comprise compounds in which at least 1 hydroxyl group is bound to a naphthalene ring. The phenolic and naphtholic compounds which are used in this process have at least 1 readily replaceable nuclear hydrogen atom (that is, a hydrogen atom bound to the aromatic ring) in order that these hydroxy aromatic compounds may be condensed with a carbohydrate or with a molecular unit present in said carbohydrate. Typical phenols include phenol itself, various alkylated phenols, such as the cresols and xylenols, also dihydric phenols, such as catechols, resorcinol, hydroquinone, orcinol (sym-dihydroxy toluene), also trihydric phenols including pyrogallol, phloroglucinol, etc., and other monohydroxy and polyhydroxy benzene compounds containing at least 1 readily replaceable nuclear hydrogen atom. This condensation reaction is also applicable to certain substituted phenols such as bromophenols, chlorophenols, aminophenols, carboxyphenols, and the like.

Carbohydrates which are condensed with aromatic compounds include cellulose, polysaccharides, monosaccharides, polyoses, hemicellulose, pentosans, pectins, inulin, glucosides and the like. The saccharides thus include the hexose sugars such as glucose, mannose, levulose, sorbose, etc., also polysaccharides, such as sucrose. Raw products rich in carbohydrates including cellulose and sugars may also be used such as wood, wood flour, starch, straw, corn stalks, bagasse, etc.

Thus the reaction of an aromatic hydrocarbon with either cellulose or glucose in the presence of liquid hydrogen fluoride catalysts results in the condensation of two molecules of aromatic hydrocarbon with each glucose unit thus forming compounds which may be referred to as 1,1-diaryl-1-desoxy-D-glucitols, the compounds being so derived from toluene and glucose or cellulose being 1,1-di-p-tolyl-1-desoxy-D-glucitol. This reaction also results in the condensation of one molecule of the aromatic hydrocarbon with one glucose unit to form a 1-aryl-glucitol, such as 1-p-tolyl-glucitol which is so derived from interaction of toluene, cellulose or glucose in the presence of liquid hydrogen fluoride. These reaction products of aromatic hydrocarbons with these carbohydrates may be referred to as di-aryl-desoxy-glucitols and aryl-glucitols, respectively. Similarly, the reaction of hydroxy aromatic compounds, such as phenols with cellulose, glucose and other carbohydrates results in the production of hydroxy aryl glucitols, including a 1-hydroxyaryl-glucitol, a 1,1-di-hydroxyaryl-1 - desoxy-D-glucitol, such as 1,1 - di-hydroxyphenyl-1-desoxy-D-glucitol which is obtained by condensing glucose or cellulose with phenol itself in the presence of a hydrofluoric acid catalyst containing preferably at least 90% by weight of hydrogen fluoride.

The polycarboxylic acids and their anhydrides which are also used as components in the reaction mixture to produce resins include maleic anhydride, succinic anhydride, glutaric anhydride, methyl maleic anhydride, chloro maleic anhydride, endomethylene-tetrahydrophthalic anhydride, phthalic anhydride, citric anhydride, aconitic anhydride, di-glycolic anhydride, camphoric anhydride, 1,8-naphthenic anhydride, etc., and the corresponding polybasic acids. Different dibasic carboxylic acids may be represented by the formula:

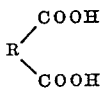

wherein R is any di-valent aliphatic or aromatic radical and the corresponding acid anhydrides may be represented by the formula:

wherein R also represents any di-valent aliphatic or aromatic radical. Rosin may also be utilized as an organic acid ingredient utilizable in the production of these modified alkyd resins.

The alkyd type resins formed in this process by reacting an aromatic polyhydric alcohol with a polybasic organic acid or its anhydride may be modified further by addition thereto of rosins, such as gum or wood rosin, or heat treated or polymerized rosin, or unsaturated vegetable oils, such as castor oil, tung oil, linseed oil, or the fatty acids derived from such oils, or by addition of synthetic resins such as phenol-aldehyde type resins.

The nature of the resin formed in this process is determined not only by choice of starting materials, but also by the molecular ratios of these materials present in the reaction mixtures. In general a less brittle resin will be formed when the polyhydric alcohol employed is not fully esterified. The brittleness characteristic of certain resins may be due to cross linking between various parts of the resin molecule.

The nature of this invention is illustrated further by the following examples which are given with no intention of limiting unduly the generally broad scope of the invention.

*Example I*

A brown colored brittle resin was produced by heating together one part by weight of 1,1-di-p-tolyl-1-desoxy-D-glucitol and 2.5 parts by weight of phthalic anhydride at a temperature of 200° to 250° C. for a time of 20 minutes. The resultant reaction mixture was dissolved in acetone, the acetone was then evaporated to leave a residue, the residue was boiled with water and the resultant water-insoluble resinous material was filtered off and dried. This resin when dissolved in an organic solvent was utilizable as a surface coating agent.

The 1,1-di-p-tolyl-1-desoxy-D-glucitol used in this process was formed by reacting two moles of toluene with one mole of cellulose at a temperature of 0° C. in the presence of at least 8 moles of substantially anhydrous hydrogen fluoride.

*Example II*

A brown resin which was less brittle than that obtained in Example I was produced by reacting 2 parts by weight of 1,1-di-p-tolyl-1-desoxy-D-glucitol with 1.2 parts by weight of phthalic anhydride at a reaction temperature of 200–250° C. during a time of 20 minutes.

We claim as our invention:

1. A process for producing a resin which comprises reacting a member of the group consisting of a polycarboxylic organic acid and an anhydride of a polycarboxylic organic acid with a member of the group consisting of a diaryl desoxy-glucitol and a di(hydroxy-aryl)-desoxy-glucitol at a temperature of from about 150° to about 300° C., and recovering the resultant resinous reaction product.

2. A process for producing a resin which comprises reacting a diaryl desoxy-glucitol with an anhydride of a polycarboxylic acid at a temperature of from about 150° to about 300° C., and recovering the resultant resinous reaction product.

3. A process for producing a resin which comprises reacting a diaryl desoxy-glucitol with a polycarboxylic acid at a temperature of from about 150° to about 300° C., and recovering the resultant resinous reaction product.

4. A process for producing a resin which comprises reacting a di(hydroxy-aryl)-desoxy-glucitol with an anhydride of a polycarboxylic acid at a temperature of from about 150° to about 300° C., and recovering the resultant resinous reaction product.

5. A process for producing a resin which comprises reacting a di(hydroxy-aryl)-desoxy-glucitol with a polycarboxylic acid at a temperature of from about 150° to about 300° C., and recovering the resultant resinous reaction product.

6. A process for producing a resin which comprises reacting phthalic anhydride with a diaryl desoxy-glucitol at a temperature of from about 200° to about 250° C., and recovering the resultant resinous reaction product.

7. A process for producing a resin which comprises reacting phthalic anhydride with 1,1-di-p-tolyl-1-desoxy-D-glucitol at a temperature of from about 200° to about 250° C., and recovering the resultant resinous reaction product.

8. A process for producing a resin which comprises reacting phthalic anhydride with 1,1-di-hydroxyphenyl-1-desoxy-D-glucitol at a temperature of from about 200° to about 250° C., and recovering the resultant resinous reaction product.

9. A resin produced by reacting 1,1-di-p-tolyl-1-desoxy-D-glucitol with phthalic anhydride at a temperature of from about 200° to about 250° C.

10. A resin produced by reacting 1,1-di-hydroxyphenyl-1-desoxy-D-glucitol with phthalic anhydride at a temperature of from about 200° to about 250° C.

11. The resinous reaction product of a compound selected from the group consisting of a polycarboxylic organic acid and an anhydride of a polycarboxylic organic acid with a compound selected from the group consisting of a diaryl desoxy-glucitol and a di(hydroxy-aryl)-desoxy-glucitol.

12. The resinous reaction product of a diaryl desoxy-glucitol with a compound selected from the group consisting of a polycarboxylic organic acid and an anhydride of a polycarboxylic organic acid.

13. The resinous reaction product of a di(hydroxy-aryl)-desoxy-glucitol with a compound selected from the group consisting of a polycarboxylic organic acid and an anhydride of a polycarboxylic organic acid.

References Cited in the file of this patent

UNITED STATES PATENTS

| 1,801,052 | Meigs | Apr. 14, 1931 |
| 1,832,038 | Meigs | Nov. 17, 1931 |
| 2,235,785 | White | Mar. 18, 1941 |